Figure 1:
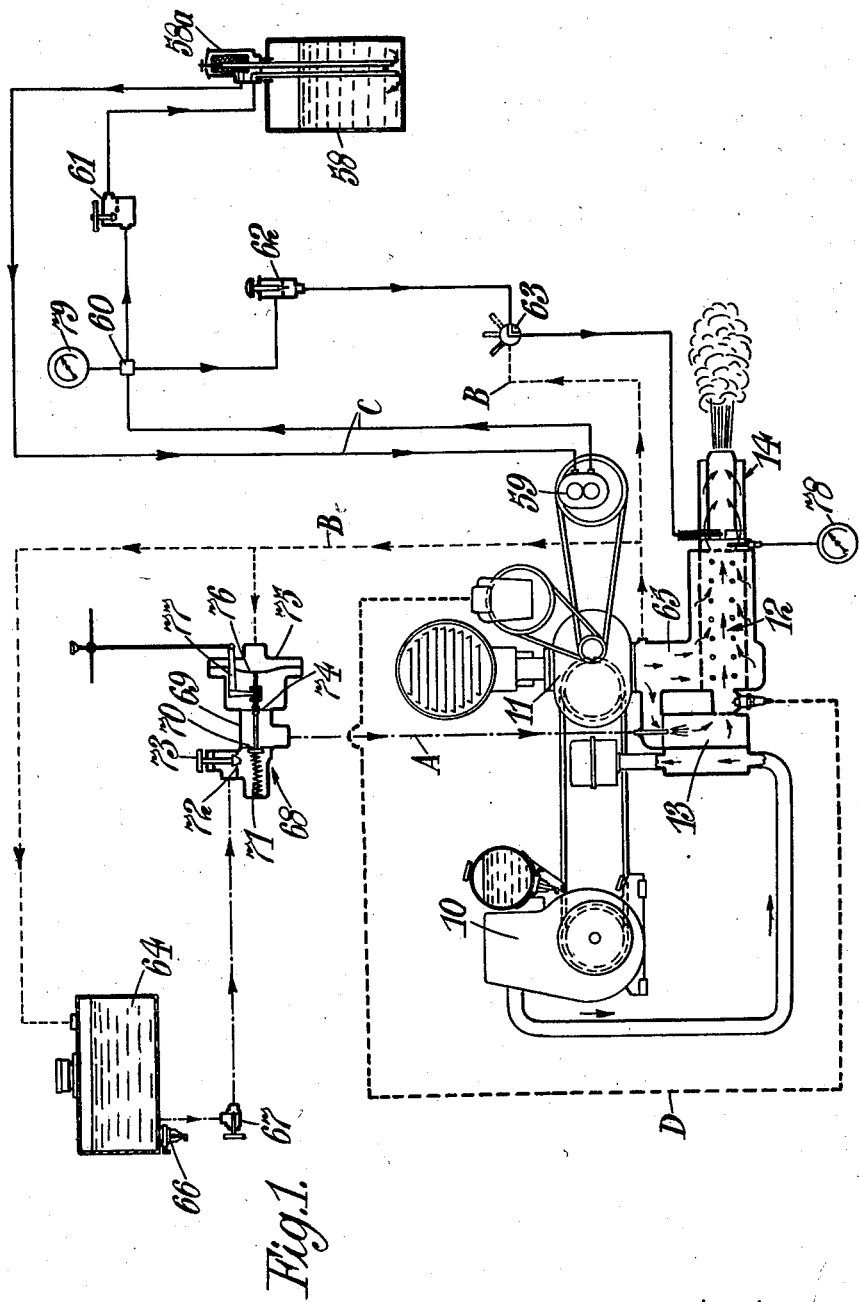

March 1, 1960 A. J. MORRIS 2,926,455
DISPERSING APPARATUS FOR CONTROL AGENTS
Filed April 23, 1956 5 Sheets-Sheet 1

Inventor
Alberto Jorge Morris
By Hopgood, Leonard & Buell
his Attorneys

Inventor
Alberto Jorge Morris

Fig.5.

United States Patent Office

2,926,455
Patented Mar. 1, 1960

2,926,455

DISPERSING APPARATUS FOR CONTROL AGENTS

Alberto Jorge Morris, Dursley, England, assignor to Lister-Todd Engineering Corporation Limited, London, England, a British company Application April 23, 1956, Serial No. 580,058

12 Claims. (Cl. 43—129)

This invention relates to apparatus for dispersing control agents or other liquid or solid substances. Such control agents may be, for example, herbicides, germicides, insecticides, fungicides, rodenticides, anti-corrosives and deodorants. Other control agents may be chemicals used in influencing meteorological conditions, such as silver chloride and silver iodide.

According to the present invention there is provided apparatus for dispersing control agents comprising means including a heater connected to be supplied with pressurized fuel and pressurized air and adapted to produce continuously therefrom a preheated combustible mixture of fuel and primary air, a combustion tube connected to receive the preheated combustible mixture, an air casing surrounding the combustion tube with a passage there-provided with apertures whereby the supplementary air continuously to said passage, said combustion tube being provided with apertures whereby the supplementary air passes from said passage into the combustion tube, ignition means in the combustion tube and operative to ignite said mixture, a mixing chamber connected to receive hot combustion gases from the combustion tube, injector means receiving a supply of a control agent and feeding said control agent into the mixing chamber, and delivery means connected to said mixing chamber and receiving the mixture of hot gas and control agent produced in said mixing chamber.

In preferred arrangements according to the invention, the control agent is in the form of a liquid, or is contained in a carrier liquid.

According to a feature of the invention an internal combustion engine may be provided to drive a blower or compressor to supply the primary air, the exhaust gas from the internal combustion engine being used to preheat the mixture of fuel and air in a heat exchanger. Alternatively the blower or compressor may be driven by an electric motor and the fuel/air mixture preheated by an electric heater.

In preferred arrangements the blower or compressor supplies both the primary air and the supplementary air.

According to a further feature of the invention the means to supply the mixture of fuel and primary air to the combustion tube comprises a fuel nozzle which is supplied with fuel under pressure and injects fuel into a divergent outlet passage, and an air nozzle surrounding said fuel nozzle and opening to said divergent outlet passage, said air nozzle being supplied with compressed air and arranged thereby to assist in atomisation of the fuel.

In one preferred arrangement of the invention a chamber is secured at the outlet of the combustion tube and air casing, said chamber having an inlet orifice which registers with the outlet of the combustion tube and having an outlet orifice in its downstream end wall, and a cup shaped member is supported within the chamber with the lip of the cup against the downstream end wall of the casing and surrounding the outlet orifice, and leaving an annular space between the cup and the wall of the chamber, the hot gases entering the cup through tangentially directed slots in the sides of the cup, and wherein said control agent is injected into the cup at the upstream end thereof, and the stream of hot gas and control agent passes through the open end of the cup and said outlet orifice. Where the control agent is in liquid form or is contained in a carrier liquid, the liquid is preferably injected into the cup through a nozzle which is secured at the base of the cup and which is connected to be supplied with the liquid under pressure, and a small proportion of the hot gas is mixed with the liquid within the nozzle thereby to provide improved distribution of control agent in the cup, the nozzle being arranged centrally in the base of the cup and arranged to inject the liquid into the cup in a radially outward direction.

The liquid may be supplied to the chamber from a tank which is adapted to be pressurised, the airspace above the liquid in the tank being connected so that the pressure in said airspace is substantially the same as the pressure of said compressed air, the arrangement being such that in the event of failure of the compressed air supply, the supply of liquid to the chamber is cut off.

Figure 2:
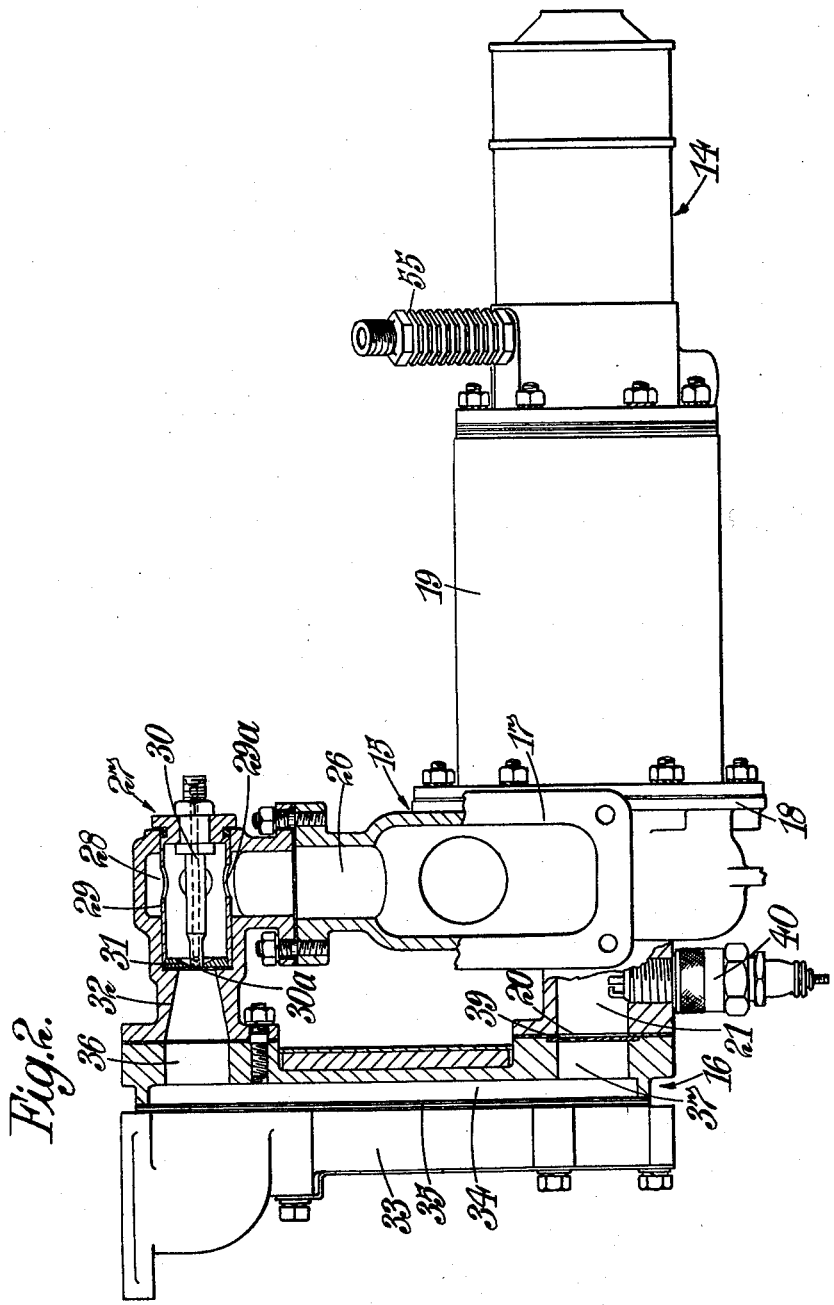
Figure 3:
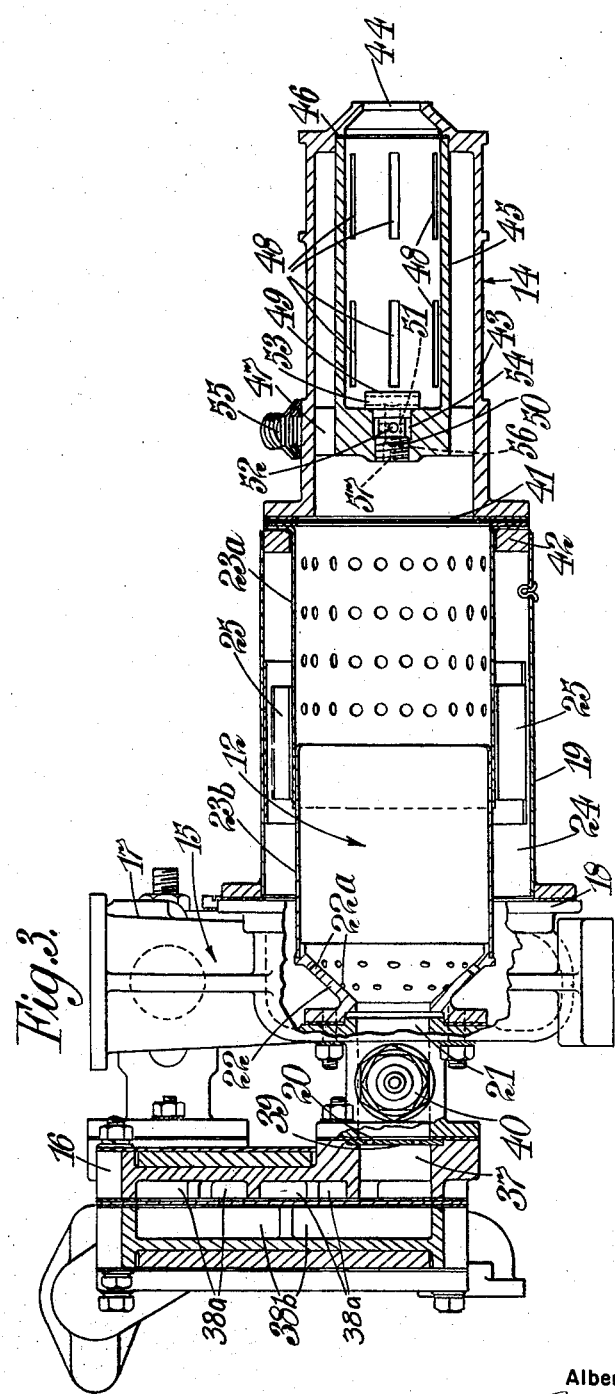
Figure 4:
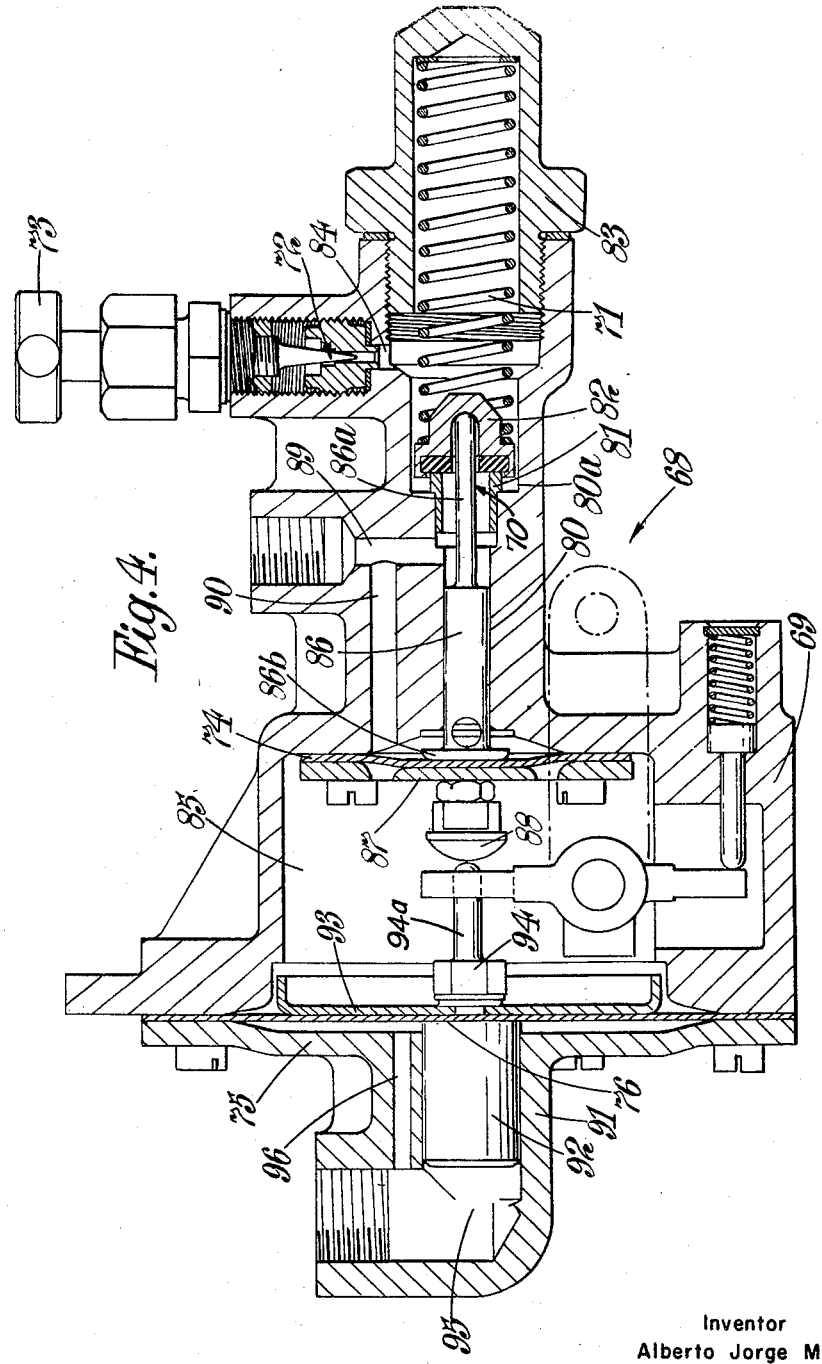

One construction of dispersing apparatus incorporating the above and other novel features will now be described by way of example, the description making reference to the accompanying drawings in which:

Figure 1 shows the general arrangement of dispersing apparatus according to this invention, Figure 2 is a plan view, partly in section, of the heat exchanger, combustion tube and mixing chamber, Figure 3 is a side view, partly in section, of the heat exchanger, combustion tube and mixing chamber, Figure 4 is a sectioned view of a preferred form of fuel cut-out and regulating unit, and Figure 5 is a view corresponding to Figure 1 showing the modifications.

In Figure 1, the paths of the fuel, air and control agent are referenced A, B and C respectively, and the high tension lead to the spark plug is referenced D.

The apparatus comprises a power unit 10, which in this embodiment is an internal combustion engine, an air compressor or blower 11 which is belt driven by the power unit, and an assembly including a combustion chamber 12, a fuel/air preheating and mixing unit 13 and a mixing chamber 14, which assembly is fed with pressure air by the compressor or blower 11, is fed with fuel by a fuel system separate from that of the power unit 10, and is fed with a solution of a control agent to be dispersed in the combustion gases in the chamber 14. The parts of the assembly and their connection to the other parts of the apparatus will be described in more detail below.

The assembly comprises a casting 15 which forms the head of the combustion chamber and divides the air supply to flow partly directly into the combustion chamber 12 and partly to the fuel/air preheating and mixing unit 16 which is secured to the casting 15.

The casting 15 is generally cup-shaped with a lateral flanged neck 17 for connection to a mating flange connection on the blower outlet, with a flanged rim 18 to which is secured a tubular member forming the air casing 19 of the combustion chamber, with a central aperture 20 in its base which provides an inlet for the preheated fuel/air mixture, and with a short duct part 21 extending from the base away from the rim 18 and opening to the aperture 20. A combustion tube 12 is mounted on the cup to extend from the base of the cup throughout the length of the air casing 19.

The combustion tube 12 is in three parts of which the inlet part 22 is a perforated frusto-conical member whereof the narrower end seats on the cup base around the central aperture, of which the downstream part 23a is a perforated tube, and of which the third part is an imperforate tube 23b joining the inlet and downstream parts. The combustion tube 12 is of smaller diameter than the air casing 19 to leave an annular air passage 24 between them.

The axis of the lateral flanged neck 17 is offset from the axis of the air casing 19 so that the air entering the air casing through the flanged neck swirls round the perforated frusto-conical part 22 of the combustion tube to effect cooling thereof. The swirling motion is however detrimental to the functioning of the perforations in the downstream part 23a of the combustion tube and a plurality of guide vanes 25 are therefore provided in the region of the upstream end of the downstream part 23a to convert the swirling motion of the air round the combustion tube to an axial flow along the annular air passage 24.

The flanged air inlet neck 17 has a lateral flanged branch 26 to which is bolted a fuel and air supply structure 27 for the heat-exchanger 16. The structure has a body with an annular chamber 28 into which air flows from the branch 26, and from which air flows through a number of apertures 29a in a tubular liner 29 accommodated centrally of the body. Coaxially within the liner, there is a fuel injector 30 terminating in a nozzle 30a arranged centrally of a convergent orifice 31 formed in a plate fitted at one end of the liner 29 to provide an air outlet therefrom. The nozzle 30a and convergent orifice 31 lead to a divergent outlet 32 formed in the body. This outlet leads to a heat-exchanger 16 wherein the fuel/air mixture is vaporized.

The heat-exchanger 16 comprises two-dish-like casing parts 33, 34 bolted together with a heat transfer plate 35 interposed between them, the casing parts being provided on their adjacent faces with flow channels 38a, 38b for the fluids flowing in heat exchange. The channels 38a for the fuel/air mixture lead from an inlet port 36 connected with the divergent outlet 32, and convey the fuel/air mixture in a sinuous path to an outlet 37 at the opposite end of the heat-exchanger. The mixture is preheated by using the exhaust gases from the internal combustion engine 10 and the exhaust gases from the engine flow through the channels 38 for the second heat-exchange fluid in counter-current with the fuel/air mixture.

In an alternative arrangement as shown in Figure 5 the blower or compressor is driven by an electric motor 97 and the fuel/air mixture is preheated by an electric heater 98, this arrangement is otherwise identical to that shown in Figures 1 to 4.

The outlet port 37 from the fuel/air mixture channel mates with the end of the short duct 21 on the base of the casting 15 above mentioned, a perforated plate 39 being provided between them as a flame trap.

The short duct 21 has fitted in it a spark plug 40 for ignition of the preheated fuel/air mixture leaving the heat-exchanger, and the mixture burns in the combustion tube 12, further air being added through the perforations 22a in the inlet part of the combustion tube and also through the perforations in the downstream part 23a. The spark plug 40 is energised by a magneto 40a driven from the blower shaft, and it is separate from that of the internal combustion engine.

The vaporization of the fuel/air mixture is advantageous over the injection of atomized liquid fuel into the combustion tube in that in the former a shorter flame is obtained and soot deposits are considerably reduced because the mixture burns with a blue flame.

The outlet end of the combustion tube is separated from the chamber by a perforated plate 41 forming a flame trap, which plate seats on a heavy ring 42 secured to the air-casing tube 19 to close the downstream end of the annular air passage 24 between it and the combustion tube.

The chamber 14 comprises a cylindrical casing 43 bolted to the heavy ring 42. The casing is open at its inlet end and has an outlet orifice 44 formed in an end wall at the downstream end of the casing.

A cup-shaped member 45 is supported coaxially within the casing in spaced relation to its wall 43, the bottom of the cup being adjacent to but spaced from the perforated plate 41. The lip of the cup is located by being engaged in an annular step-like recess 46 which is formed in the end wall of the casing round the inner end of the outlet orifice 44, and the upstream end of the cup is supported by a plurality of swirl vanes 47 which are formed on the external surface of the cup 45 adjacent its upstream end and which extend to the wall of the casing 43.

The annular passage surrounding the cup member 45 is connected to the interior of the cup by a plurality of slots 48 which are formed in the sides of the cup and which extend parallel to the axis of the cup. The hot gases entering the chamber 14 pass into the annular passage between the cup 45 and the wall of the casing 43 and in so doing have a swirl imparted to them by the swirl vanes 47. The slots 48 in the sides of the cup are shaped to impart a tangential swirl to the gases passing through them and also serve as an additional flame trap to prevent flames reaching the inside of the cup 45.

In this arrangement the control agent is in the form of a liquid, or is contained in a carrier liquid, and the liquid is injected under pressure into the hot gases swirling within the cup 45 through a nozzle 49 disposed in the upstream end (or base) of the cup. The nozzle 49 is threaded into a central bore 50 in the base of the cup 45 and has an axial bore 51 leading from inlet ports 52 to radial bores 53 which form outlets to within the cup. The inlet ports 52 communicate with an annular recess 54 in the wall of the central bore 50 in the base of the cup, the liquid being fed to the recess 54 from a union piece 55 mounted on the wall of the casing 43. The end of the axial bore remote from the radial bores is fitted with a plug 56 having a small hole 57 in it to allow a small proportion of the hot gases entering the chamber 14 to flow into the axial bore 51 and mix with the liquid before it passes to the radial outlets 53 of the nozzle 49, and this helps to ensure an even distribution of the liquid within the cup 45.

From the cup 45 the mixture of liquid and hot gases flows through the outlet orifice and is directed where desired by means of a deflector or flexible hose or the like (not shown).

The control agent containing liquid is supplied to the union piece of the chamber from a container 58 by means of a pump 59 which is driven from the blower shaft. The pump 59 which passes a quantity of the liquid in excess of the quantity required for injection into the cup 45 draws the liquid from the container 58 through a strainer 58a and delivers it to a point 60 in a pipeline between two valves, the first of which is a pressure control valve 61 which regulates the pressure at which the liquid is delivered to the union piece 55 and allows the excess liquid to flow back into the container 58 in a manner to produce turbulence. The second of the valves is a particle size selector valve 62 which regulates the quantity of solution flowing to the chamber 14. The liquid passes from the particle size selector valve 62 to a three-way valve 63, by which the flow of the liquid to a pipe leading to the union piece 55 is initiated or stopped, and which also allows this pipe to be cleared by compressed air from the blower 11.

The union piece 55 is conveniently provided with cooling fins.

The supply of fuel for the combustion tube 12 is contained in a tank 64 which is pressurised from the blower delivery duct 65. Fuel leaves the tank 64 under gravity assisted by the pressure in the tank 64 and passes through a filter 66 and a fuel control valve 67 to a fuel regulator and cut-out unit 68, and thence to the fuel injector of the fuel-air mixing and preheating unit.

The action of the fuel regulator and cut-out unit 68 is to cut off the supply of fuel to the combustion tube in the event of a failure in the magneto circuit or any mechanical defect which results in failure to ignite the fuel and air mixture.

The fuel regulator and cut-out valve unit 68 is shown diagrammatically in Fig. 1 but in one preferred arrangement the unit comprises a body part 69 which has a central bore 80 extending along its length. The bore 80 has an increased diameter part 80a at one end and an annular insert 81 at the change of diameter affords the seating of the cut-out valve 70. A valve member 82 in the increased diameter part of the bore engages the seating and is urged into a closed position by a compression spring 71, the other end of which abuts the bottom of a central deep recess formed in a cap-screw 83 which closes off the adjacent end of the bore 80, the walls of the recess serving to locate the spring.

Fuel entering the unit flows through a regulating valve 72 and thence through a port 84 which opens into the enlarged diameter part 80a of the bore. The regulating valve 72 comprises a tapering needle valve member cooperating with a seating, the position of valve member being adjustable by means of a cock 73.

The other end of the central bore 80 opens into the dished end of a chamber 85, but a flexible diaphragm 74 seals the dished end from the main part of the chamber. A plunger 86 is engaged in the bore 80 and has a reduced diameter part 86a which abuts the cut-out valve member 82 in the sense to lift the valve member 82 off its seating against the force of the compression spring 71. A threaded extension of the plunger 86 passes through the diaphragm 74 and through a washer 87, and a domed nut 88 engages the extension so as to secure the diaphragm 74 to the plunger 86. The central part of the diaphragm 74 is protected on one side by the washer 87 and on the other by an enlarged head 86b formed on the plunger.

The part of the bore in which the reduced diameter portion of the plunger moves has an outlet port 89 for the fuel which leads to an outlet union. A passage 90 extends between the fuel outlet passage and the dished end of the chamber 85 so that a high fuel pressure acts on the diaphragm 74 in the sense of moving the plunger to allow the cut-out valve 70 to close.

At the end of the chamber 85 opposite the flexible diaphragm 74 there is provided an end plate 75 and a second flexible diaphragm 76 is held between the end plate 75 and the body part 69 so as to close off the chamber 85, the end plate 75 being dished so that there is a gap between the end plate 75 and the central part of the diaphragm 76. The end plate has a central boss-like portion 91 extending away from the diaphragm 76 and having a central bore which is coaxial with the bore 80 in the body part and a piston member 92 slides in the bore. A bolt 94, the head of which is provided with an upstanding pin 94a passes through the centre of the diaphragm 76 and serves to secure the diaphragm 76 and its stiffening plate 93 to the piston 92. The end of the upstanding pin 94a just touches the domed nut 88.

A space 95 at the end of the piston remote from the diaphragm 76 is connected to the combustion tube 12 by a pipe, and a by-pass duct 96 connects this space directly to the gap between the diaphragm 76 and the dished part of the end plate 75, so that the pressure in the combustion tube 12 is exerted over the area of the diaphragm 76. The resultant force is transmitted through the pin 94a to the plunger 86, which therefore holds the cut-out valve 70 open. If the mixture in the combustion tube 12 fails to ignite, the pressure on the diaphragm 76 is insufficient to hold the cut-out valve 70 open against the force of the compression spring 71 and the fuel supply is therefore cut off. Also since the pressure of the fuel in the outlet passage is exerted on the diaphragm 74 through the passage, excessive pressure in the fuel outlet passage allows the spring 71 to move the valve member 82 in the sense of reducing the fuel flow through the valve.

For starting purposes a hand-operable lever 77 is provided to engage the domed nut and to open the cut-out valve 70. This lever can be released when combustion commences. A spring loaded plunger is provided to limit the free movement of the starting lever so that it cannot accidentally interfere with the moving parts of the unit.

The complete apparatus is conveniently compactly arranged and secured in a frame, and instruments such as a pyrometer gauge 78 to measure the temperature of the gases leaving the combustion tube, and a control agent pressure gauge 79 are conveniently grouped together with the various controls in a control panel.

I claim:

1. Apparatus for dispersing control agents comprising means to produce a mixture of fuel and primary compressed air, a combustion tube arranged to receive said mixture which is adapted to be burnt therein, an air casing surrounding the combustion tube and spaced therefrom so as to leave an annular passage therebetween, means to supply supplementary compressed air to said passage, said combustion tube comprising a perforated frusto-conical inlet portion, an imperforated central portion and a perforated downstream portion arranged coaxially with each other, whereof the inlet portion is divergent in the direction of flow and has its upstream end connected to an inlet passage to receive the fuel/air mixture, means to supply supplementary compressed air to said annular passage, said supplementary air entering the air casing tangentially adjacent the upstream end of the air casing and flowing into the combustion tube through the perforations in said inlet and downstream portions, a plurality of guide vanes located in said passage and arranged to reduce or destroy any tangential swirl of the supplementary air flowing towards the perforations in said downstream portion, said annular passage being closed off downstream of the perforations in said downstream portion, means to inject control agent into the hot gas stream and delivery means for the mixture of hot gas and control agent so produced.

2. Apparatus as claimed in claim 1 wherein there is provided means for cutting off the fuel supply if the pressure of the air supplied to the combustion tube falls below a selected value comprising a valve body having a fuel inlet and a fuel outlet, a valve between the inlet and the outlet, pressure responsive means responsive to the pressure of the air supplied to the combustion tube which pressure responsive means is connected to the valve and arranged to open it progressively with increase of said pressure, and a return spring acting on the valve and arranged progressively to close it with decrease of said pressure.

3. Apparatus for dispersing control agents comprising means including a heater connected to be continuously supplied with pressurized fuel and pressurized air and adapted to produce continuously therefrom a preheated combustible mixture of fuel and primary air, a combustion tube arranged to receive the preheated combustible mixture, an air casing surrounding the combustion tube with a passage therebetween, air supply means adapted to deliver supplementary air continuously to said passage, said combustion tube being provided with apertures whereby the supplementary air passes from said passage into the combustion tube, ignition means in the combustion tube and operative to ignite said mixture, a mixing chamber connected to receive hot combustion gases from the combustion tube, injector means adapted to receive a supply of a control agent and feed said control agent continuously into the mixing chamber, and delivery means connected to said mixing chamber receive the mixture of hot gas and control agent produced in said mixing chamber.

4. Apparatus as claimed in claim 3, wherein there is provided a compressor connected to supply the primary air, and an internal combustion-engine connected to drive the compressor, and said heater comprises a heat exchanger connected to receive exhaust gas from said engine and adapted to utilize the heat of said exhaust gas to preheat the mixture.

5. Apparatus as claimed in claim 3, wherein there is provided a compressor connected to supply the primary air, and an electric motor to drive the compressor, and said heater comprises an electric heating means.

6. Apparatus as claimed in claim 3, including a flame trap disposed in the path of the hot gases between the outlet of said combustion tube and the inlet to said mixing chamber means.

7. Apparatus as claimed in claim 3, wherein there is provided a plurality of guide vanes disposed at circumferentially-spaced locations in the passage between the air casing and the combustion tube and adapted to reduce any tangential swirl of the supplementary air in said passage in a direction round the combustion tube prior to its delivery into the combustion tube through said apertures.

8. Apparatus for dispersing control agents comprising means for continuously producing a combustible mixture of fuel and primary air including duct means part of which comprises a divergent passage, a fuel nozzle which is connected to be supplied with fuel under pressure and is adapted to inject fuel continuously into the divergent outlet passage, an air nozzle surrounding said fuel nozzle and opening to said divergent outlet passage, said air nozzle being connected to be supplied continuously with compressed air, heater means associated with said duct for preheating the mixture, a combustion tube arranged to receive the preheated combustible mixture, an air casing surrounding the combustion tube with a passage therebetween, air supply means adapted to deliver supplementary air continuously to said passage, said combustion tube being provided with apertures whereby the supplementary air passes from said passage into the combustion tube, ignition means in the combustion tube and operative to ignite said mixture, a mixing chamber connected to receive hot combustion gases from the combustion tube, injector means adapted to receive a supply of a control agent and feed said control agent into the mixing chamber, and delivery means connected to said mixing chamber to receive the mixture of hot gas and control agent produced in said mixing chamber.

9. Apparatus for dispersing control agents comprising means including a heater connected to be supplied with pressurized fuel and pressurized air and adapted to produce continuously therefrom a preheated combustible mixture of fuel and primary air, a combustion tube arranged to receive the preheated combustible mixture, an air casing surrounding the combustion tube with a passage therebetween, air supply means adapted to deliver supplementary air continuously to said passage, said combustion tube being provided with apertures whereby the supplementary air passes from said passage into the combustion tube, ignition means in the combustion tube and operative to ignite said mixture, a mixing chamber secured at the outlet of the combustion tube and air casing, said mixing chamber having an inlet orifice which registers with the outlet of the combustion tube and having an outlet orifice in its downstream end wall, and a cup shaped member supported within the chamber having a lip which is disposed against the downstream end wall of the casing and surrounding the outlet orifice, and leaving an annular space between the cup and the wall of the chamber, the cup being provided with tangentially directed slots in the sides thereof through which the hot gas resulting from combustion of the mixture enters the cup, means to inject said control agent continuously into the cup at the upstream end thereof, and the delivery means connected to said outward orifice to receive the mixture of hot gas and control agent produced in the mixing chamber means.

10. Apparatus as claimed in claim 9, wherein swirl vanes are provided in said annular space adapted to impart a swirl to the hot gas stream prior to its entry inot the cup.

11. Apparatus as claimed in claim 9, for use with a liquid control agent, wherein the injection means comprises an injection nozzle which is provided in the base of the cup and is adapted to inject liquid into the cup in a radially outward direction.

12. Apparatus for dispersing control agents comprising means including a heater connected to be supplied with pressurized fuel and pressurized air and adapted to produce continuously therefrom a preheated combustible mixture of fuel and primary air, a combustion tube arranged to receive the preheated combustible mixture, an air casing surrounding the combustion tube with a passage therebetween, air supply means adapted to deliver supplementary air continuously to said passage, said combustion tube being provided with apertures whereby the supplementary air passes from said passage into the combustion tube, a spark plug located adjacent the upstream end of the combustion chamber and operative to ignite the mixture, a flame trap located in the path of the mixture just upstream of the spark plug, a mixing chamber connected to receive hot combustion gases from the combustion tube, a second flame trap disposed in the path of said gases between the outlet of the combustion tube and the inlet to said mixing chamber, injector means adapted to receive a supply of control agent to feed said control agent into the mixing chamber and delivery means connected to said mixing chamber and adapted to receive the mixture of hot gas and control agent produced in the mixing chamber.

References Cited in the file of this patent

UNITED STATES PATENTS

| 2,476,171 | Williams | July 12, 1949 |
| 2,625,211 | Hill | Jan. 13, 1953 |

FOREIGN PATENTS

| 713,043 | Great Britain | Aug. 4, 1954 |